(12) United States Patent
Roy

(10) Patent No.: US 11,919,569 B2
(45) Date of Patent: Mar. 5, 2024

(54) CAST PART OF A MOTOR VEHICLE

(71) Applicant: Nissan Motor Co., Ltd., Kanagawa (JP)

(72) Inventor: Jean-Baptiste Roy, Guyancourt (FR)

(73) Assignee: Nissan Motor Co., Ltd., Kanagawa (JP)

( * ) Notice: Subject to any disclaimer, the term of this patent is extended or adjusted under 35 U.S.C. 154(b) by 356 days.

(21) Appl. No.: 17/598,089

(22) PCT Filed: Mar. 12, 2020

(86) PCT No.: PCT/EP2020/056726
§ 371 (c)(1),
(2) Date: Sep. 24, 2021

(87) PCT Pub. No.: WO2020/193166
PCT Pub. Date: Oct. 1, 2020

(65) Prior Publication Data
US 2022/0185372 A1     Jun. 16, 2022

(30) Foreign Application Priority Data
Mar. 25, 2019   (FR) ...................................... 1903035

(51) Int. Cl.
| | |
|---|---|
| *B62D 21/00* | (2006.01) |
| *B62D 21/02* | (2006.01) |
| *B62D 25/08* | (2006.01) |
| *B62D 29/00* | (2006.01) |

(52) U.S. Cl.
CPC ............ *B62D 21/00* (2013.01); *B62D 21/02* (2013.01); *B62D 25/08* (2013.01); *B62D 29/008* (2013.01)

(58) Field of Classification Search
CPC ........ B62D 21/02; B62D 21/00; B62D 25/00; B62D 25/08; B62D 25/20; B62D 25/2009; B62D 25/2018; B62D 25/2027; B62D 25/2036; B62D 29/008; B62D 29/041
USPC ................... 296/204, 203.01, 2, 209, 29, 30
See application file for complete search history.

(56) References Cited

U.S. PATENT DOCUMENTS

| | | | |
|---|---|---|---|
| 8,668,248 B2 * | 3/2014 | Ishizono .............. | B62D 25/025 296/70 |
| 8,985,681 B2 * | 3/2015 | Fujii .................. | B62D 25/2036 296/204 |
| 9,067,627 B2 * | 6/2015 | Hara .................... | B62D 21/152 |
| 10,822,035 B2 * | 11/2020 | Takahashi .......... | B62D 25/2018 |

* cited by examiner

*Primary Examiner* — Dennis H Pedder
(74) *Attorney, Agent, or Firm* — Osha Bergman Watanabe & Burton LLP

(57) ABSTRACT

An aluminum cast part of a motor vehicle includes at least two upper walls rising from a bottom wall to form a passage, and at least two lower walls extending the upper walls beyond the bottom wall. The upper and lower walls form, with the bottom wall, a cross-section transverse to the passage which is generally H-shaped. In one or more predetermined cross-sections, at least one upper inner rib extends inside the H and transversely to the upper walls and the bottom wall, at least one outer rib extends outside the H to form an extension of the upper inner rib, and at least one lower inner rib extends inside the H to form an extension of the upper inner rib. A height of the upper inner rib in a central area of the H is compensated for by a height of the lower inner rib in the central area.

11 Claims, 4 Drawing Sheets

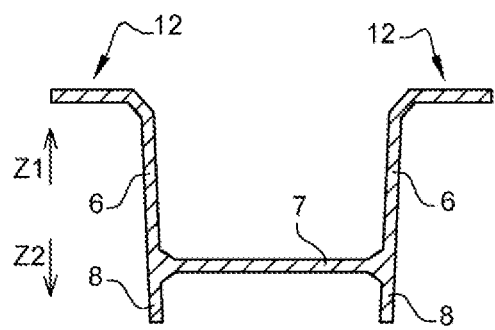
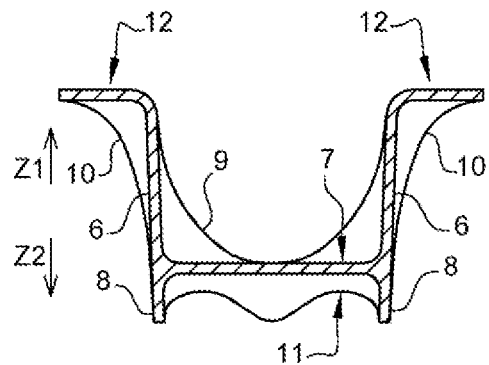
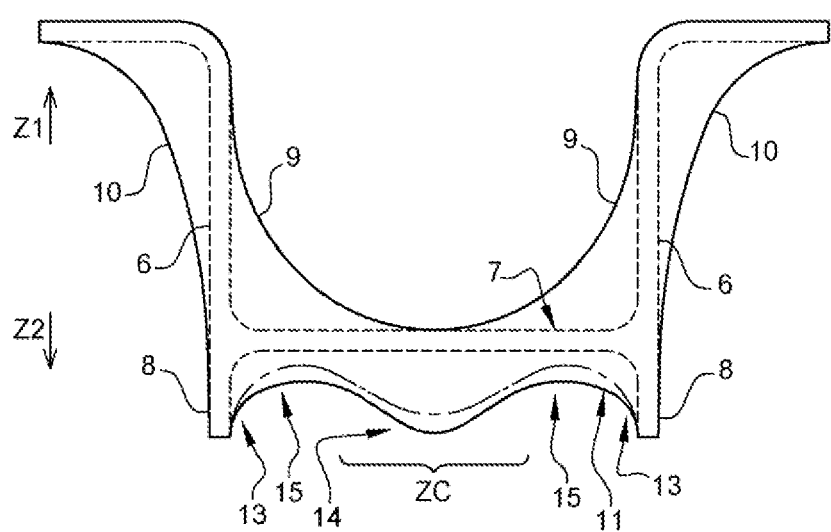

Fig. 11

| | U-shaped section | H-shaped section Variant 1 | H-shaped section Variant 2 |
|---|---|---|---|
| General section (IGy) | $0.39 \times 10^{-6}$ m$^4$ | $0.3 \times 10^{-6}$ m$^4$ | $0.3 \times 10^{-6}$ m$^4$ |
| General section (IGz) | $0.74 \times 10^{-6}$ m$^4$ | $0.78 \times 10^{-6}$ m$^4$ | $0.78 \times 10^{-6}$ m$^4$ |
| Ribbed section (IGy) | $0.9 \times 10^{-6}$ m$^4$ | $0.67 \times 10^{-6}$ m$^4$ | $0.73 \times 10^{-6}$ m$^4$ |
| Ribbed section (IGz) | $1.93 \times 10^{-6}$ m$^4$ | $1.79 \times 10^{-6}$ m$^4$ | $1.82 \times 10^{-6}$ m$^4$ |
| Linear density (general section) | 1.82 Kg/m | 1.93 Kg/m | 1.93 Kg/m |
| Mass (rib system) | 6.1 g | 3.9 g | 4.3 g |

CAST PART OF A MOTOR VEHICLE

BACKGROUND

The present invention relates to a casting for a motor vehicle. The invention relates more particularly to an aluminum casting constituting, for example, a part of a front or rear side member elbow of the understructure of a motor vehicle. This side member elbow is a structural component of the vehicle, typically connecting a front side member of the vehicle to a central side member of the vehicle in a lateral zone of the front bulkhead, or a structural component connecting a rear side member to the skirt of the vehicle.

Lightening constraints targeting lower consumption for combustion-engine, hybrid and electric vehicles lead motor vehicle manufacturers to prioritize aluminum castings for structural nodes that were previously designed to be made from stamped sheets and assembled by welding in the factory processes known as "metal-joining" techniques. This is the case for example for the side member elbows of certain vehicles, which are structural components that provide, on each side of the bodyshell of the vehicle, the interface between front or rear side members of the vehicle and the central side member or skirt of the understructure of the vehicle. This front side member elbow is also connected to a transverse structural crossmember, typically a lower bulkhead crossmember. Their installation on the understructure of the vehicle, at the intersection of a plurality of force paths, lead them to preserve the integrity of the passenger compartment cell of the vehicle. These side member elbows consequently have to be extremely rigid and reinforced in different zones. In the example that is of interest, the side member elbow is made up of a lower part said to be under the bodyshell and an upper part said to be in the passenger compartment interior, joined to one another so as to form a particularly rigid hollow body. The lower part of the side member elbow is thus made as an aluminum casting. Such elements are conventionally provided with a relatively dense network of stiffening ribs, countering the low material density of the aluminum relative to the reference steel. It will be noted that the upper part can be made of hardened steel sheet. The assembly of the various multi-material parts of the side member elbow is ensured by mechanical connections of the self-piercing rivet type, but also by an epoxy-based glue, ensuring better stiffness of the bodyshell and structurally enhancing these mechanical connections, which are vulnerable to tearing in comparison with a conventional spot weld.

Moreover, the surface and anticorrosion treatments by cataphoresis lead to the structure being immersed in various chemical and electrochemical baths. The fluids enter the hollow bodies via orifices known as debubbling, emptying and anti-Faraday cage electric field supply orifices in order to ensure the necessary protection, including inside the side member elbow. Upon removal from each of the baths, the fluid has to be evacuated/emptied from the hollow bodies. On known vehicle structures made of steel, the lower part of the side member elbow involves a natural flow principle, similar to a basin, minimizing the need for multiple holes. Unlike cast elbows, the network of ribs generates multiple zones for retention of fluid that it is necessary to evacuate by adding small holes with a diameter smaller than 10 mm for each of these cells.

Now, these orifices then have to be completely plugged, so as to prevent water entering the hollow body, for the following reasons: the epoxy-based glue is very sensitive to water, which makes it lose its structural properties and therefore has a negative effect on its durability. Furthermore, the combination of steel and aluminum of the side member elbow causes the appearance of differences in electrical potential between the two materials, which will cause a galvanic attack phenomenon, in the presence of an electrolyte such as water, liable to corrode the aluminum. The side member elbow consequently has to be made completely leaktight using beads of mastic for peripheral sealing of the component and/or expandable inserts and/or shutters or pellets for the orifices. Counting both sides of the structure, tens of orifices to be plugged can easily be counted, and this represents a not insignificant additional production cost, these additional closing-off operations not being automatable and therefore entailing operators dedicated to this new constraint.

SUMMARY OF DISCLOSURE

The aim of the invention is to remedy the preceding drawbacks by proposing an aluminum casting typically used to form a side member elbow for a motor vehicle, which has optimal integrity and mechanical stiffness, while eliminating or drastically reducing the number of orifices necessary for the evacuation of the anticorrosion and surface treatment fluids.

To this end, the subject of the invention is a casting, in particular made of aluminum, for a motor vehicle, including at least two upper walls rising in a first direction from a bottom wall, forming a passage, characterized in that it also includes at least two lower walls extending the upper walls beyond the bottom wall in a second direction opposite the first direction, such that the upper walls and lower walls form with the bottom wall a section transverse to the passage that has the overall shape of an H, the casting also including, in one or more given cross sections, at least one upper internal rib extending inside the H and transversely to the upper walls and to the bottom wall, at least one external rib extending outside the H in the extension of the upper internal rib, at least one lower internal rib extending inside the H and in the extension of the upper internal rib, the upper internal rib and the lower internal rib being shaped such that a reduced height of the upper internal rib in a central zone of the H is compensated for by an increased height of the lower internal rib in the same central zone, this height being considered relative to the bottom wall.

Other advantageous features of the invention are presented below.

The upper internal rib has a free edge that has the overall shape of a U, the central zone of the U being substantially flush or coincident with the bottom wall, leaving a channel for circulation of the fluids.

The upper walls include upper extensions that are substantially parallel to the bottom wall and arranged in opposite directions, the external rib bearing against an external face of the upper wall and against a lower face of the upper extension, which extensions are generally situated between two connections and guarantee the transmission of transverse forces.

The lower internal rib has lateral parts bearing against the lower walls and a central part having an increased height, the lateral parts being connected to the central part by intermediate zones of reduced height relative to the lateral parts and to the central part, these heights being considered with respect to the bottom wall.

The lateral parts of the lower internal rib have a free edge arranged tangentially relative to an internal face of the lower walls, this free edge also having a curvilinear overall shape between the lower walls.

The central part of the lower internal rib has a height of between 5 and 20 mm, and in particular substantially equal to 10 mm, this height being considered relative to the bottom wall, so as to allow the installation of this rib, correcting the weakness linked to the free edge mentioned above.

The upper internal rib and the lower internal rib have a combined height that is substantially constant in at least a part of the central zone of the H, this height being considered relative to the bottom wall, and the part in question of the central zone extending over a dimension of between 10 and 30 mm parallel to the bottom wall.

The lower walls have a height of between 5 and 20 mm, and in particular substantially equal to 10 mm, this height being considered relative to the bottom wall.

The casting is said to be deep in the sense that the height of the H is greater than 50 mm.

The casting includes a plurality of cavities, each delimited by upper walls and a bottom wall, these cavities opening at the top and containing at least one upper internal rib, while lower walls are directed downward and contain between them at least one lower internal rib in the extension of the upper internal rib.

The casting constitutes a lower part of a side member elbow forming an interface between a front side member or rear side member and a central side member of the understructure of a motor vehicle.

The invention will be better understood upon reading the following description of a non-limiting example of the invention, and in light of the appended drawings.

BRIEF DESCRIPTION OF DRAWINGS

FIG. 8 shows a partial section of an H-shaped casting according to the invention, in a zone without ribs.

FIG. 9 shows a partial section of a casting according to FIG. 8, in a zone passing through the web of a stiffening rib.

FIG. 10 shows an enlarged view of the partial section in FIG. 9, indicating dimensions corresponding to two described exemplary embodiments.

FIG. 11 is a table indicating, by way of indication, examples of dimensions and inertias compared between a U-shaped cross section of the prior art and an H-shaped cross section according to the invention.

DETAILED DESCRIPTION

In the description, the directions and orientations are given with reference to a direct orthonormal frame of reference conventionally used in automotive design, in which X denotes the front-rear longitudinal direction of the vehicle, pointing toward the rear of the vehicle, Y is the direction transverse to the vehicle, pointing toward the right of the vehicle, and Z is the vertical direction, pointing upward.

The concepts of "front" and "rear" are given with reference to the direction of normal travel, toward the front of the vehicle. The terms "upper" and "lower" are indications of location that should be considered in accordance with the conventional concepts of "top" and "bottom".

Figure 1:
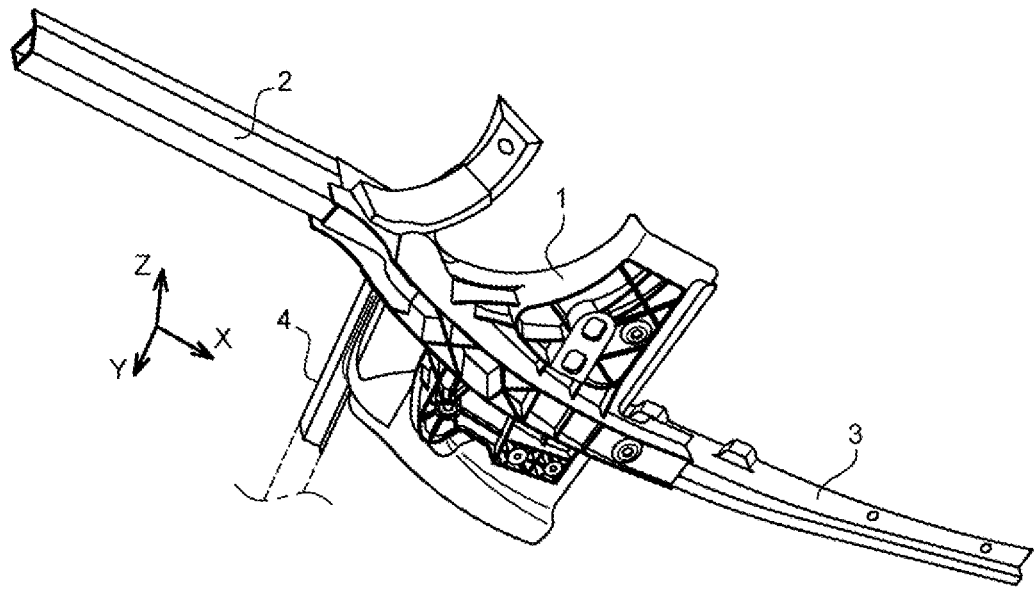
FIG. 1 shows a perspective view from below of the left-hand part of a structural assembly of the understructure of a vehicle, including a casting according to the invention, this casting being a side member elbow.
Figure 2:
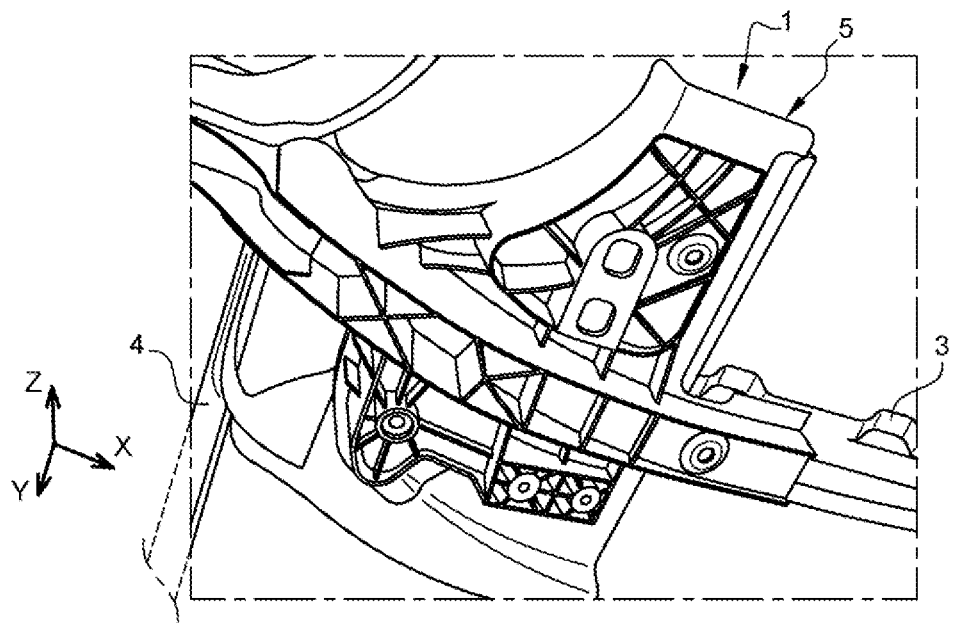
FIG. 2 shows a partial enlarged view of the casting in FIG. 1.

FIGS. 1 and 2 show an assembly of structural elements forming part of the understructure of a motor vehicle.

This illustrated assembly is situated on the left-hand side of the vehicle, it being understood that the right-hand side is arranged symmetrically in the same way, except for a few details. This assembly has at its center a front side member elbow 1, the latter realizing a join between a front side member 2 and a central side member 3 of the understructure of the vehicle, which are shown respectively on the left in FIG. 1 and extend substantially in the longitudinal direction X of the vehicle. The left and right front side member elbows 1 of the vehicle are conventionally connected to one another by a middle bulkhead crossmember 4 shown partially in FIGS. 1 and 2. The lower part of the side member elbow 1 constitutes an aluminum casting 5. The side member elbow 1 also has an upper part made of stamped steel sheet that is added to the casting 5 and forms therewith a hollow body. In the rest of the disclosure, interest is focused only on the casting 5. This casting comprises a network of stiffening ribs that afford the casting the necessary mechanical integrity.

Figure 3:
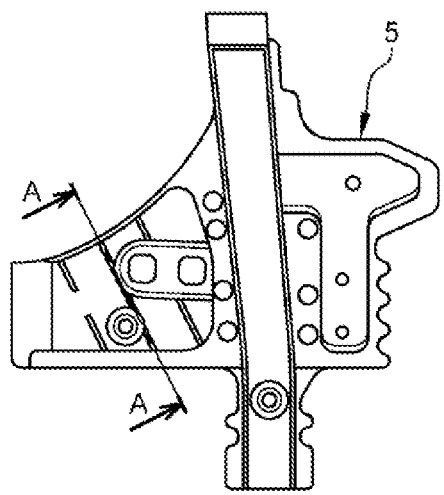
FIG. 3 shows an interior view, in other words a top view, of the casting in FIG. 1.
Figure 4:
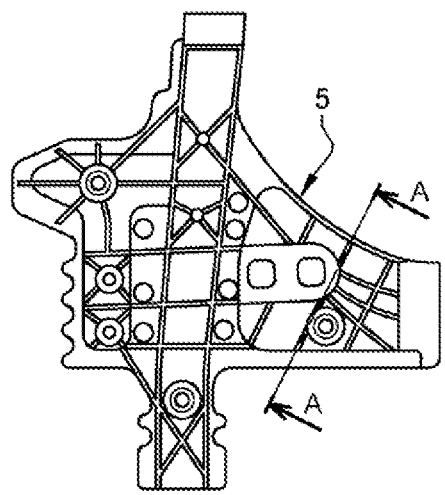
FIG. 4 shows an exterior view, in other words a bottom view, of the casting in FIG. 1. This casting is that of FIG. 3 after being turned over through 180°.

FIGS. 3 and 4 respectively illustrate interior and exterior views of the casting 5, i.e. views from above and below, taking into account the fact that this casting closes a hollow body. The network of ribs can be seen on both faces of this casting 5, as will be seen below. This network of ribs is made up of walls and ribs extending substantially perpendicularly and vertically relative to a bottom wall which here is substantially horizontal. The term "horizontal" should be considered here in a broad and general sense, given the fact that the side member elbow has a slightly curved overall shape and rises, in its front part, toward the front side member of the vehicle.

In order to illustrate the invention, a cross section of the casting 5 is considered, this section being inscribed in a substantially vertical section plane. A part of this cross section of the casting according to the invention is shown in FIGS. 9 and 10.

In this cross section, the casting 5 comprises two upper walls 6 rising in a first direction Z1 from a bottom wall 7, forming a passage. This passage extends perpendicular to the section and extends essentially in the X or Y directions or a combination of the X and Y directions. The network of crisscrossed ribs of the casting 5 means that this same type of arrangement is found in a multitude of sections of the casting. The casting 5 includes at least two lower walls 8 extending the upper walls 6 beyond the bottom wall 7 in a second direction Z2 opposite the first direction Z1, such that the upper walls 6 and lower walls 8 form with the bottom wall 7 a section transverse to the passage that has the overall shape of an H.

According to the invention, the casting 5 also includes, in at least one given cross section, at least one upper internal rib 9 extending inside the H and transversely to the upper walls 6 and to the bottom wall 7, at least one external rib 10 extending outside the H in the extension of the upper internal rib 9, at least one lower internal rib 11 extending inside the H and in the extension of the upper internal rib 9. These ribs are inscribed in the same cross section, and therefore in a single plane. In this cross section, the H shape of the bottom wall 7 and of the upper walls 6 and lower walls 8 is embedded in the web of the aforementioned ribs. The ribs have a demolding draft of approximately 2° to 4°, having a thickness that is variable between the tip (narrower) and the base (wider) in the vicinity of the bottom wall 7. This is true both for the upper internal rib 9 and the lower internal rib 11. The mean or widest thickness corresponds substantially to the thickness of the bottom wall 7 and of the upper walls 6 and lower walls 8. Moving away from the plane of the ribs out of their zone of thickness (in a direction perpendicular to the plane of FIGS. 9 and 10, inside the passage delimited by the upper walls and the bottom wall 7), an H-shaped configuration is found that is in accordance with that which has been described above with reference to FIG. 8. This is why this H shape has been shown in dashed line in FIGS. 9 and 10.

According to one noteworthy aspect of the invention, the upper internal rib 9 and the lower internal rib 11 are shaped such that a reduced height of the upper internal rib 9 in a central zone ZC of the H is compensated for by an increased height of the lower internal rib 11 in the same central zone ZC. These heights are considered relative to the bottom wall 7 and are measured respectively in the direction Z1 regarding the upper internal rib 9 and in the direction Z2 regarding the lower internal rib 11.

According to another noteworthy aspect of the invention, the upper internal rib 9 has a free edge that has the overall shape of a U, as can be seen in FIGS. 9 and 10. The central zone of the U is substantially flush or coincident with the bottom wall 7. In other words, in a central zone ZC of the H, the free edge of the U is arranged tangentially relative to the upper surface of the bottom wall 7. This has the advantage of allowing the conveying of the cataphoresis and surface treatment fluids inside the passage delimited by the upper walls 6 and the bottom wall 7. This low arrangement at the center of the upper internal rib 9 places in communication the spaces separated by one or more ribs, and this allows the fluid to be conveyed and to reach main evacuation openings, without it being necessary to provide a large number of orifices that are distributed in each cavity on either side of the ribs.

With reference to FIG. 8, the upper walls 6 include upper extensions 12 that are substantially parallel to the bottom wall 7 and arranged in opposite directions. These upper extensions 12 are thus shaped at right angles to the upper walls 6, to within the stamping draft ranging from 3° to 5° per face. As can be seen in FIGS. 9 and 10, each external rib 10 bears against both a corresponding external face of the upper wall 6 and a lower face of the upper extension 12.

Moreover, the lower internal rib 11 has lateral parts 13 bearing against the lower walls 8, and more precisely against the internal faces thereof. These lateral parts 13 of the lower internal rib 11 are such that their free edge of the rib is arranged tangentially to the internal face of the lower wall 8. The lower internal rib 11 also has a central part 14 having an increased height that is maximized for the architecture volume allocated to the painted assembled bodyshell. The lateral parts 13 are connected to the central part 14 by intermediate zones 15 of reduced height relative to the lateral parts 13 and to the central part 14. These heights are considered in the direction Z2 with respect to the bottom wall 7. The central part 14 is situated in the middle of the central zone ZC, these being equidistant from the lower walls 8. It will be noted that the free edge of the lower internal rib 11 has a curvilinear overall shape between the lower walls 8, the succession "lateral part 13, intermediate zone 15, central part 14, intermediate zone 15 and lateral part 13" having a wavy shape with alternating heights.

According to a particular embodiment of the invention, the central part 14 of the lower internal rib 11 has a height of between 5 and 20 mm. In an exemplary embodiment of the invention, this height of the central part 14 is substantially equal to 10 mm, this height being considered relative to the bottom wall 7.

The lower walls 8 have a height of between 5 and 20 mm, and in particular substantially equal to 10 mm, this height being considered relative to the bottom wall 7. As illustrated in solid line in FIG. 10, in one particular embodiment of the invention ("variant 2"), the lower internal rib 11 has a height equal to the height of the lower walls 8. Another embodiment of the invention ("variant 1") has also been illustrated, in dashdotted line, in which the lower internal rib 11 has a smaller height, both in its central part 14 and in the intermediate zones 15. By way of indication, the height of the central part is reduced by approximately 25% and the height of the intermediate zones is reduced by approximately 50% in variant 1 compared with variant 2.

According to a particularly advantageous aspect of the invention, the upper internal rib 9 and the lower internal rib 11 have a combined height that is substantially constant in at least a part of the central zone ZC of the H, this height being considered relative to the bottom wall 7. In the embodiment illustrated, which is not exhaustive, the part in question of the central zone ZC extends over a dimension of between 10 and 30 mm parallel to the bottom wall 7. As a result, the free edge of the lower internal rib 11 has a shape that "follows", in a substantially parallel manner, the shape of the free edge of the upper internal rib 9. The heights of the ribs 9, 11 therefore compensate for one another above and below the bottom wall 7, so as not to weaken the casting 5 owing to the loss of height of the upper internal rib 9 at the center of the U.

Figure 5:
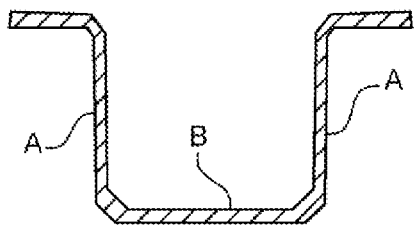
FIG. 5 shows a partial section of a U-shaped casting according to the prior art, in a zone without ribs.
Figure 6:
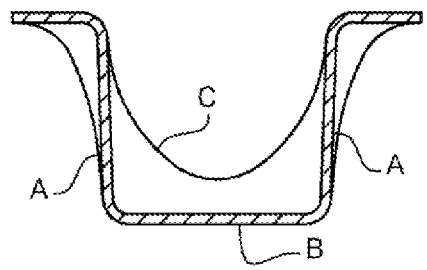
FIG. 6 shows a partial section of a casting according to the prior art, in a zone passing through the web of a stiffening rib.
Figure 7:
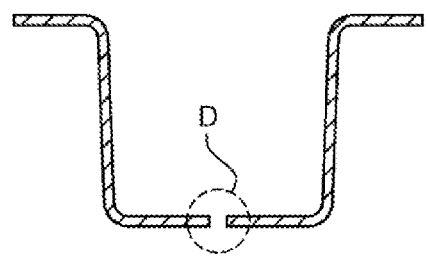
FIG. 7 shows a partial section of a casting according to the prior art, in a zone passing through a fluid evacuation orifice.

The particular features of the invention are even better emphasized with reference to FIGS. 5 to 7, which illustrate a partial cross section of a conventional casting of the prior art. In this case, the H shape illustrated above is formed by a U, delimited only by lateral walls A and a bottom wall B, without lower walls. An upper internal rib C connects the lateral walls A. In order to afford mechanical integrity and stiffness that are equivalent to the invention, the upper internal rib C has in this case a free edge that is necessarily above the bottom wall B, and this constitutes an obstacle and separates the cavities for the evacuation of the treatment fluids from the structure. As illustrated in FIG. 7, one or more orifices D are then indispensable at the bottom of each cavity so as to allow the evacuation of the fluids. The invention makes it possible to very advantageously get around this constraint, which entails long and expensive plugging operations later in the process and an avoidable increase in the cost of the product.

A comparative table of inertias and masses is indicated in FIG. 11 by way of indication to show a trend in terms of performance, and without any limitation.

This table places in parallel, in the first column, values for the U-shaped section of the prior art in FIGS. 5 to 7, and, in the second and third columns, values corresponding to variants 1 and 2 of the invention as described above. Variant 1 has a lower internal rib of reduced height relative to variant 2, which is taller and best uses the allocated volume defined by the space in the lower zone of the H.

According to one feature of the invention, the casting 5 is said to be deep in the sense that the height of the H, i.e. the combined height of the upper walls 6 and the lower walls 8, is greater than 50 mm. In exemplary embodiments, the combined height is typically of the order of 60, 70 or 80 mm.

That which is described above for a given partial section A-A of the casting 5 (cf. FIG. 4 and by turning over through 180° the casting illustrated in FIG. 3) can be applied to a plurality of partial sections of the casting, taken in various zones and in planes that are not necessarily parallel, depending on the shape in question of the network of ribs. Specifically, the casting 5 illustrated in FIGS. 1 to 4 includes a plurality of cavities, each delimited by upper walls and a bottom wall, these cavities opening at the top and containing at least one upper internal rib. Lower walls are directed downward and contain between them at least one lower internal rib in the extension of the upper internal rib.

In the description above, the casting 5 constitutes a lower part of a front side member elbow 1 forming an interface between a front side member 2 and a central side member 3 of the understructure of a motor vehicle. In variant embodiments, the same type of casting can be used for the rear side member elbow (not shown), forming an interface between a rear side member and a skirt of the vehicle.

Of course, the invention is not limited to the embodiments or variant embodiments described above, and includes all the technical equivalents of these means.

The invention claimed is:

1. A casting made of aluminum, for a motor vehicle, comprising:
    a bottom wall;
    at least two upper walls rising in a first direction from the bottom wall to form a passage; and
    at least two lower walls extending the upper walls beyond the bottom wall in a second direction opposite the first direction, such that the upper walls and lower walls form with the bottom wall a section transverse to the passage that has the overall shape of an H,
    in one or more given cross sections, at least one upper internal rib extending inside the H and transversely to the upper walls and to the bottom wall, at least one external rib extending outside the H in the extension of the upper internal rib, and at least one lower internal rib extending inside the H and in the extension of the upper internal rib,
    wherein the upper internal rib and the lower internal rib are shaped such that a reduced height of the upper internal rib in a central zone of the H is compensated for by an increased height of the lower internal rib in the same central zone (ZC), the height being considered relative to the bottom wall.

2. The casting according to claim 1, wherein the upper internal rib has a free edge that has the overall shape of a U, the central zone of the U being substantially flush or coincident with the bottom wall.

3. The casting according to claim 1, wherein the upper walls comprise upper extensions that are substantially parallel to the bottom wall and arranged in opposite directions, the external rib bearing against an external face of the upper wall and against a lower face of the upper extension.

4. The casting according to claim 1, wherein the lower internal rib has lateral parts bearing against the lower walls and a central part having an increased height, the lateral parts being connected to the central part by intermediate zones of reduced height relative to the lateral parts and to the central part, the heights being considered with respect to the bottom wall.

5. The casting according to claim 4, wherein the lateral parts of the lower internal rib have a free edge arranged tangentially relative to an internal face of the lower walls, the free edge also having a curvilinear overall shape between the lower walls.

6. The according to claim 4, wherein the central part of the lower internal rib has a height of between 5 and 20 mm, the height being considered relative to the bottom wall.

7. The casting according to claim 1, wherein the upper internal rib and the lower internal rib have a combined height that is substantially constant in at least a part of the central zone of the H, the height being considered relative to the bottom wall, and the part in question of the central zone extending over a dimension of between 10 and 30 mm parallel to the bottom wall.

8. The casting according to claim 1, wherein the lower walls have a height of between 5 and 20 mm, the height being considered relative to the bottom wall.

9. The casting according to claim 1, wherein the height of the H is greater than 50 mm.

10. The casting according to claim 1, further comprising a plurality of cavities, each delimited by upper walls and a bottom wall, the cavities opening at the top and containing at least one said upper internal rib, while lower walls are directed downward and contain between the lower walls at least one said lower internal rib in the extension of the upper internal rib.

11. The casting according to claim 10, wherein the casting constitutes a lower part of a side member elbow forming an interface between a front side member or rear side member and a central side member of an understructure of a motor vehicle.

* * * * *